US012638157B2

United States Patent
(12) United States Patent
Nemec et al.

(10) Patent No.: US 12,638,157 B2
(45) Date of Patent: May 26, 2026

(54) OPTICAL SYSTEMS FOR A LUMINAIRE

(71) Applicant: ROBE lighting s.r.o., Roznov pod Radhostem (CZ)

(72) Inventors: Petr Nemec, Krhova (CZ); Tomas Micunek, Roznov pod Radhostem (CZ); Jan Vilem, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/407,774

(22) Filed: Dec. 3, 2025

(65) Prior Publication Data

US 2026/0085817 A1 Mar. 26, 2026

Related U.S. Application Data

(60) Provisional application No. 63/727,484, filed on Dec. 3, 2024.

(51) Int. Cl.
*F21V 14/00* (2018.01)
*F21V 5/00* (2018.01)
(Continued)

(52) U.S. Cl.
CPC .............. *F21V 14/06* (2013.01); *F21V 5/007* (2013.01); *F21V 5/008* (2013.01); *F21V 7/0091* (2013.01);
(Continued)

(58) Field of Classification Search
CPC .......... F21V 14/06; F21V 5/007; F21V 5/008; F21V 7/0091
See application file for complete search history.

(56) References Cited

U.S. PATENT DOCUMENTS 8,434,901 B2 * 5/2013 Jouffrieau ............... F21V 17/02 362/322
2001/0055209 A1 * 12/2001 Dedoro ................... F21V 17/02 362/268

(Continued)

FOREIGN PATENT DOCUMENTS

WO 2017165680 A1 9/2017
WO 2019209221 A2 10/2019

OTHER PUBLICATIONS

European Extended Search Report; Application No. 25220573.7; Apr. 14, 2026; 6 pages.

*Primary Examiner* — Gerald J Sufleta, II
(74) *Attorney, Agent, or Firm* — Conley Rose, P.C.; Brooks W Taylor

(57) ABSTRACT

A luminaire includes a first array light engine, a second array light engine, and a control system. The first array light engine includes a plurality of light emitters and first and second lens arrays, each with pluralities of lenslets. Collimation of light rays from the first array light engine varies as the second lens array moves relative to the first lens array. The second array light engine has a linear array of light emitters and a linear lens. Collimation of light rays from the linear lens varies as the linear lens moves relative to the linear array of light emitters. The control system controls a beam angle of the light rays from the first array light engine by moving the second lens array and controls a beam angle of the light rays from the linear lens by moving the linear lens.

14 Claims, 8 Drawing Sheets

(51) Int. Cl.

| | |
|---|---|
| ***F21V 7/00*** | (2006.01) |
| ***F21V 14/06*** | (2006.01) |
| *F21Y 105/10* | (2016.01) |
| *F21Y 113/00* | (2016.01) |
| *F21Y 115/10* | (2016.01) |

(52) U.S. Cl.
CPC ....... *F21Y 2105/10* (2016.08); *F21Y 2113/00* (2013.01); *F21Y 2115/10* (2016.08)

(56) References Cited

U.S. PATENT DOCUMENTS

| | | | | |
|---|---|---|---|---|
| 2004/0042085 | A1* | 3/2004 | Hough | G02B 27/0961 362/555 |
| 2010/0309665 | A1 | 12/2010 | Young et al. | |
| 2015/0308663 | A1* | 10/2015 | Jurik | F21V 17/007 362/277 |
| 2016/0061439 | A1 | 3/2016 | Jurik et al. | |
| 2016/0290597 | A1* | 10/2016 | Jurik | G02B 19/0066 |
| 2017/0074489 | A1* | 3/2017 | Jurik | F21V 29/763 |
| 2020/0224854 | A1* | 7/2020 | Jurik | F21V 9/40 |
| 2023/0071012 | A1* | 3/2023 | Vilem | F21V 5/007 |

* cited by examiner

OPTICAL SYSTEMS FOR A LUMINAIRE

CROSS-REFERENCE TO RELATED APPLICATIONS

This application claims priority to U.S. Provisional Application No. 63/727,484 filed Dec. 3, 2024 by Petr Nemec, et al. entitled, "Optical Systems for a Luminaire," which is incorporated by reference herein.

TECHNICAL FIELD OF THE DISCLOSURE

The disclosure generally relates to luminaires, and more specifically to optical systems for an automated luminaire.

BACKGROUND

Some luminaires in the entertainment and architectural lighting markets include automated and remotely controllable functions. Such luminaires may be used in theatres, television studios, concerts, theme parks, night clubs, and other venues. A luminaire may provide control over the pan and tilt functions of the luminaire allowing an operator to control a direction that the luminaire is pointing and thus a position of the luminaire's light beam on a stage or in a studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern. Where such luminaires are remotely controllable, they may be referred to as automated luminaires. Such luminaires may emit continuous light or may emit light in short pulses as strobes. There is a need for the user to be able to change a beam angle of the emitted light beam.

SUMMARY

A luminaire includes a first array light engine, a second array light engine, and a control system. The first array light engine includes a plurality of light emitters configured to emit a first plurality of collimated light beams, and first and second lens arrays, each lens array including a plurality of lenslets. The first lens array is in a fixed position relative to the plurality of light emitters and the second lens array is configured to move along an optical axis of the first array light engine relative to the first lens array. The first lens array is configured to receive the first plurality of collimated light beams and emit a second plurality of light beams and the second lens array is configured to receive the second plurality of light beams and to emit a third plurality of light beams. The light rays of the third plurality of light beams are collimated when the second lens array is at its greatest separation from the first lens array and become increasingly divergent as the second lens array moves closer the first lens array. The second array light engine includes a linear array of light emitters configured to emit a diverging first linear light beam, and a linear lens configured to receive the diverging first linear light beam and to emit a second linear light beam. A long axis of the linear array of light emitters is parallel to a long axis of the linear lens. The linear lens is configured to move along the optical axis of the second array light engine relative to the linear array of light emitters. The light rays of the second linear light beam are collimated when the linear lens is at its greatest separation from the linear array of light emitters and become increasingly divergent as the linear lens moves closer to the linear array of light emitters. The control system is configured (i) to control a beam angle of the third plurality of light beams by moving the second lens array relative to the first lens array along an optical axis of the first array light engine and (ii) to control a beam angle of the second linear light beam by moving the linear lens relative to the linear array of light emitters along an optical axis of the second array light engine.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Figure 1:
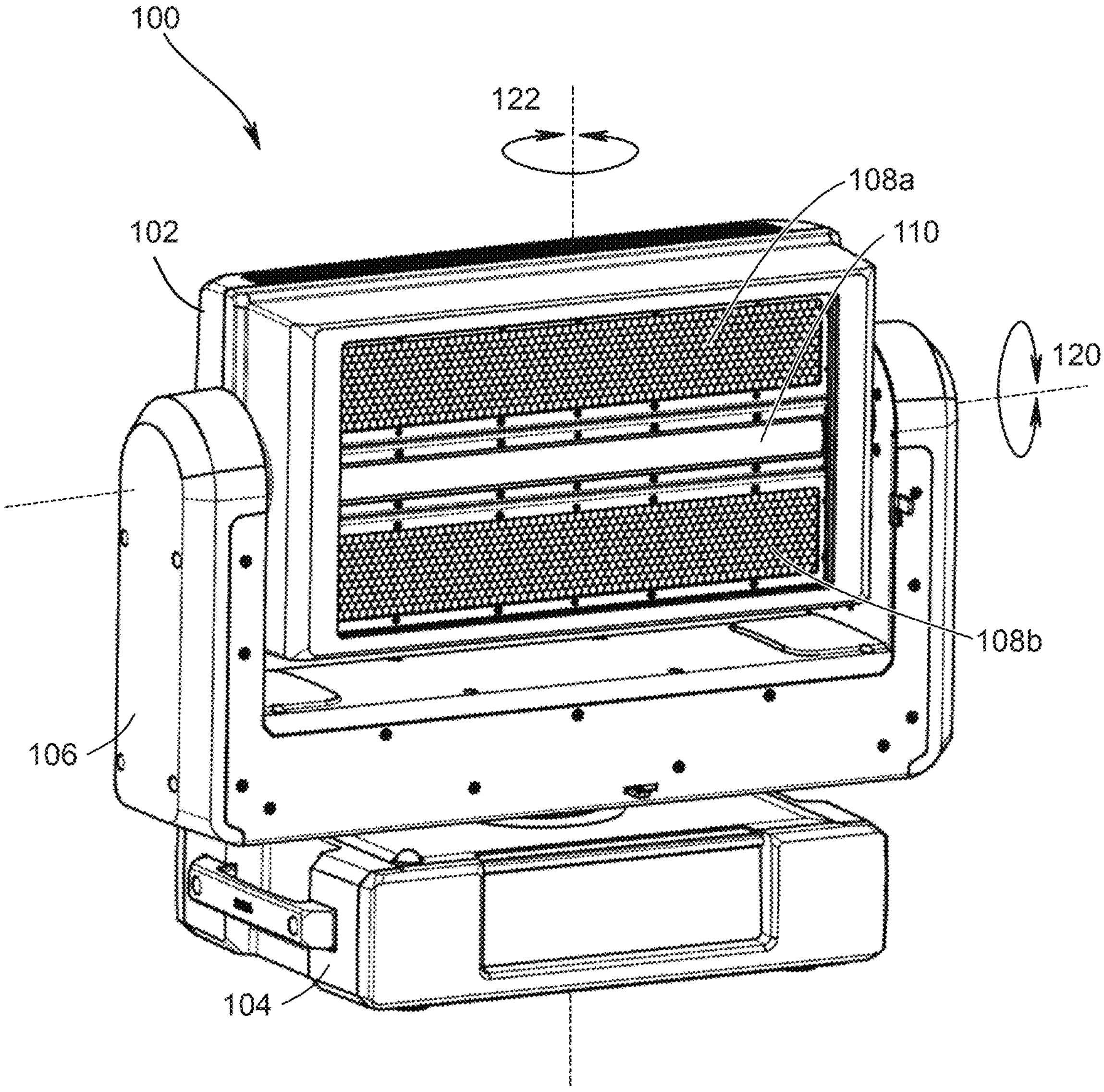
FIG. 1 presents a view of a luminaire according to the disclosure.

FIG. 1 presents a front view of a luminaire 100 according to the disclosure. The luminaire 100 comprises a head 102, which is configured to rotate within a yoke 106 about a tilt axis 120. The yoke 106 is configured to rotate relative to a fixed enclosure 104 (e.g., a base 104) about a pan axis 122. The tilt axis 120 and the pan axis 122 are orthogonal to each other. Both pan and tilt motions may be mechanically coupled to hand-operated manual controls or may be coupled for motion to motors, linear actuators, or other electromechanically controlled mechanisms. Such electromechanical mechanisms may be under the control of a microcontroller or other programmable control system included in the light fixture. In some embodiments, the control system may be controlled locally via a user interface included in the light fixture. In other embodiments, the control system may be in wired or wireless communication via a data link with a remotely located control console that an operator uses to command the control system to move the head 102 to a position specified by the operator in the command. In such embodiments, the operator is able to direct light output from the automated luminaire in a desired direction, through motion of the head 102 in the pan axis 122 and tilt axis 120. As shown in FIG. 1, the luminaire 100 also includes array light output lenses 108*a* and 108*b* and linear output lens 110.

Figure 2:
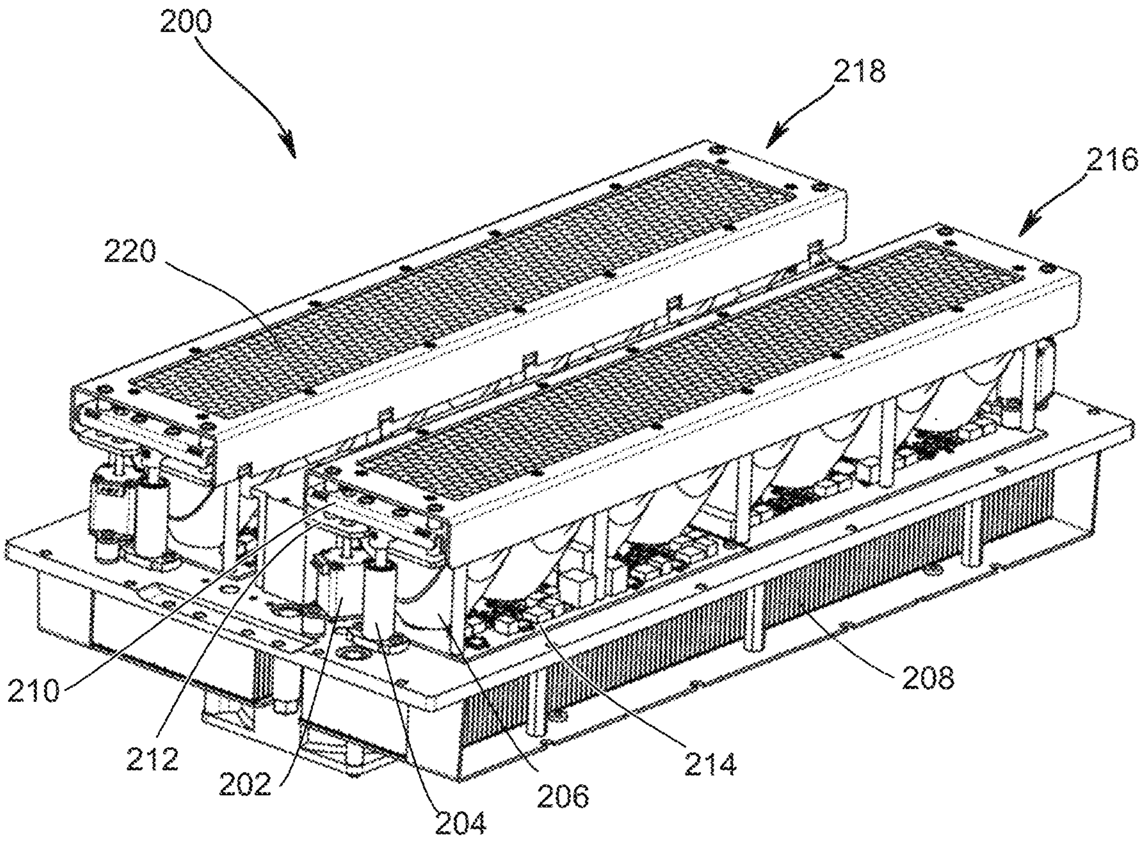
FIG. 2 presents a view of optical assemblies of the luminaire of FIG. 1.

FIG. 2 presents a view of optical assemblies 200 of the luminaire 100. In particular this view shows first and second array light engines 216 and 218 located within the head 102. As will be seen in more detail in FIG. 3, each array light engine 216 and 218 comprises lens arrays 210 and 212, each including a plurality of lenslets 220. In some embodiments, lens arrays 210 and 212 and their lenslets 220 are identical. In other embodiments lens arrays 210 and 212 comprise different numbers and/or shapes of lenslets 220. Lenslets 220 within each lens array 210 and 212 may be arranged in any configuration relative to each other, and the lens arrays themselves may have another shape than rectangular. The lenslets 220 are convex-convex lenslets but, in other embodiments, may have other shapes, such as plano-convex, concave-convex, or their inverse combinations, so as to produce a desired light output. A plurality of light emitters is mounted on circuit board 214 with a corresponding plurality of primary collimating optics 206 so as to provide light beams comprising collimated light rays (collimated light beams) into first lens array 212. Each lenslet of the first lens array 212 is configured to receive less than the full collimated light beam emitted from a primary collimating optic 206, and each primary collimating optic 206 is configured to emit light to a plurality of lenslets 220 of the first lens array 212.

The light emitters may comprise a single light emitting diode (LED), an LED array, a single laser, a laser array, or other type of light source capable of emitting colored light, white light, or a combination of both. The light emitters may comprise a total internal reflection (TIR) lens, a double condenser, or a reflector configured to collimate light beams emitted by the light emitters. For a light source containing multiple colors of emitters a light mixing element can be incorporated to ensure uniform color blending. Light mixing elements may include fly-eye lenses, light diffusers, mixing rods, mixing chambers, or combinations of elements. In some embodiments, the light emitters comprise a TIR lens configured to collimate and mix colors of the light rays from the light emitters. Cooling of light emitters may be through heatsink 208 and cooling fans (shown in FIG. 8).

First lens array 212 is in a fixed position relative to the light emitters, while second lens array 210 is configured for movement along the optical axis of the light source. When the first lens array 212 and the second lens array 210 are close to each other, the array light engine is configured to produce a wide-angle output beam. As second lens array 210 is moved away from first lens array 212, the output beam narrows in angle towards a configuration where the output beam is collimated. By controlling the separation of the first and second lens arrays, the user may select a desired output angle for the light beam.

In the embodiment presented in FIG. 2, second lens array 210 rides on shafts within linear bearings 204 and is moved along the optical axis by motors 202 that drive linear motion lead screws. In some embodiments, the motors 202 are stepper motors. Further embodiments may utilize other mechanisms to move second lens array 210 including gears, belts, or other mechanical systems.

Figure 3:
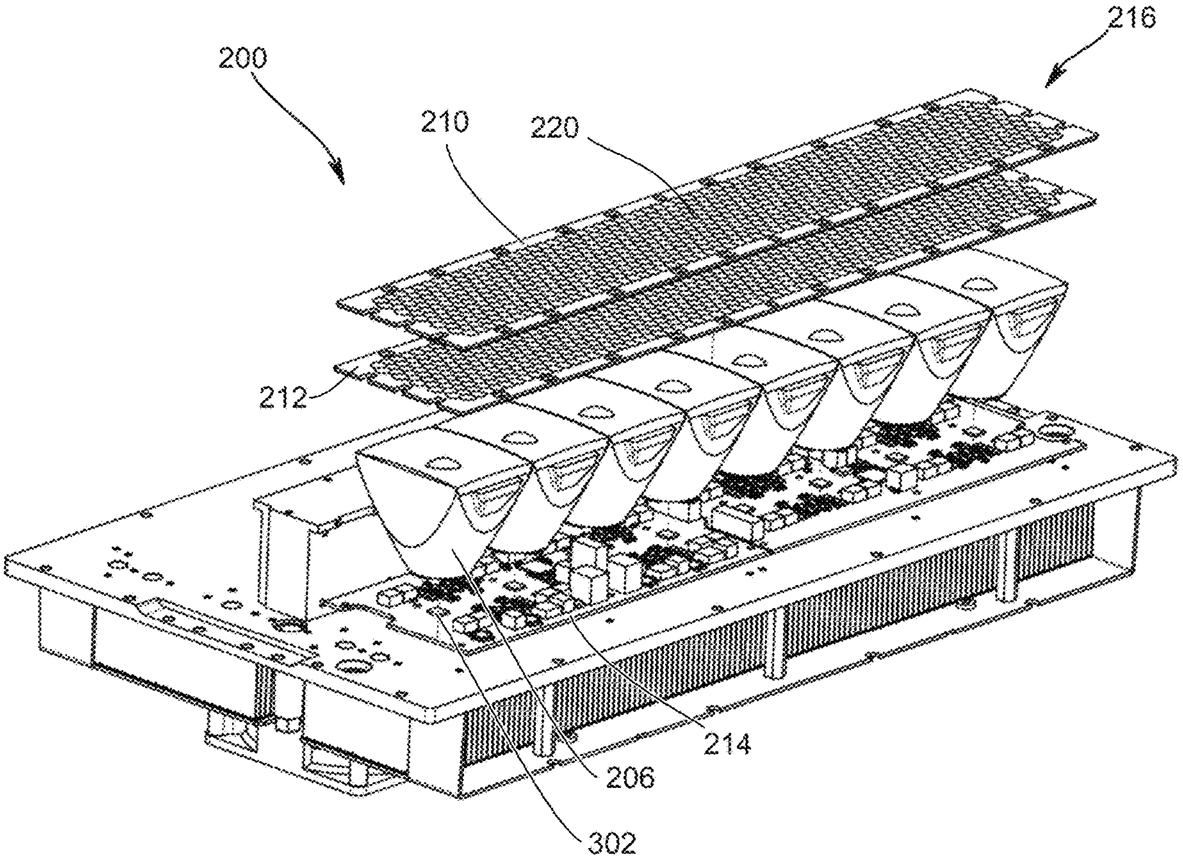
FIG. 3 presents a partially exploded view of an array light engine of the luminaire of FIG. 1.

FIG. 3 presents a partially exploded view of the array light engine 216 of the luminaire 100 of FIG. 1. Light emitters 302 mounted on circuit board 214 emit light through primary collimating optics 206 into first lens array 212 and hence into second lens array 210. In some embodiments, at least some of the light emitters 302 are an LED array comprising red, green, blue, and white LEDs.

Figure 4A:
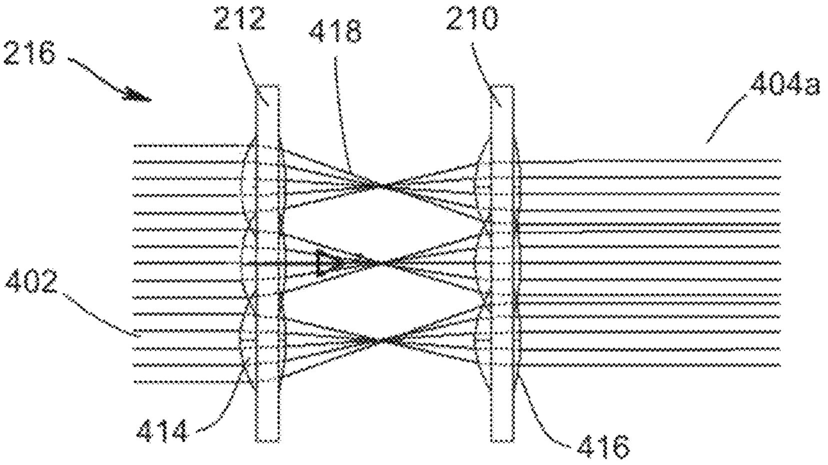
FIGS. 4A, 4B, and 4C present ray trace diagrams of the array light engine of FIG. 3 in configurations producing different beam angles.
Figure 4B:
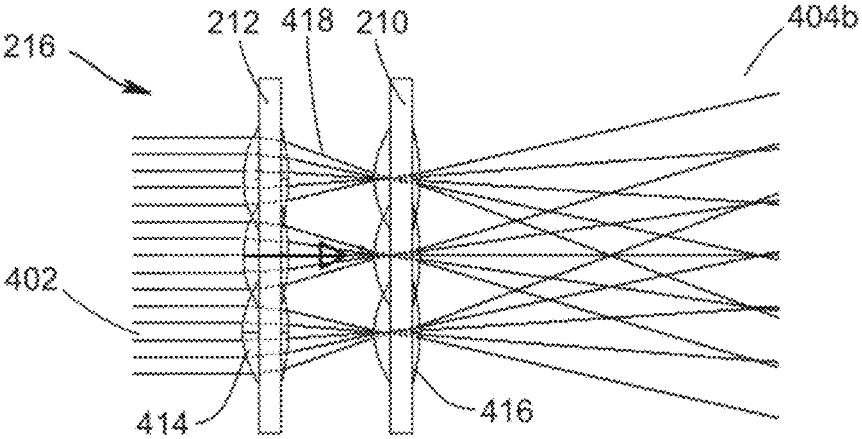
Figure 4C:
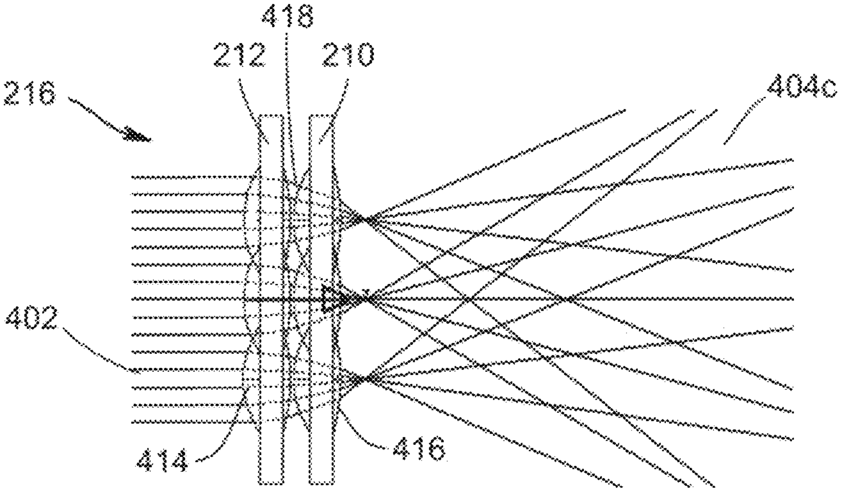

FIGS. 4A, 4B, and 4C present ray trace diagrams of the array light engine 216 of FIG. 3 in configurations producing different beam angles in an emitted light beam. Note that, for clarity, FIGS. 4A, 4B, and 4C show only a portion of the array light engine 216, showing just three lenslets 220. In FIG. 4A, a first plurality of collimated light beams 402 from the light emitters 302 and primary collimating optics 206 (not shown in FIGS. 4A, 4B, and 4C) is received by the first lens array 212, which comprises lenslets 414. The first lens array 212 emits a second plurality of light beams 418. The second plurality of light beams 418 is received by the second lens array 210, which comprises lenslets 416. The second lens array 210 emits a third plurality of light beams 404*a*. In the configuration shown in FIG. 4A, the second lens array 210 is positioned at its greatest separation from the first lens array 212 and the emitted light beams 404*a* are at their narrowest angle and are substantially collimated. In FIG. 4B, the second lens array 210 is positioned at a distance from the first lens array 212 that is intermediate between the configurations of FIGS. 4A and 4C and the emitted light beams 404*b* are diverging beams having an intermediate beam angle, which is wider than in FIG. 4A but narrower than in FIG. 4C. In FIG. 4C, the second lens array 210 is positioned at its closest distance from first lens array 212 and the emitted light beams 404*c* are diverging beams at their widest angle. Thus, the array light engine 216 is configured to convert a collimated beam into either collimated or diverging beams, depending upon a position of the second lens array 210 relative to the first lens array 212. The pluralities of light beams 404*b* and 404*c* comprise diverging light rays and may be referred to as diverging light beams.

Figure 5:
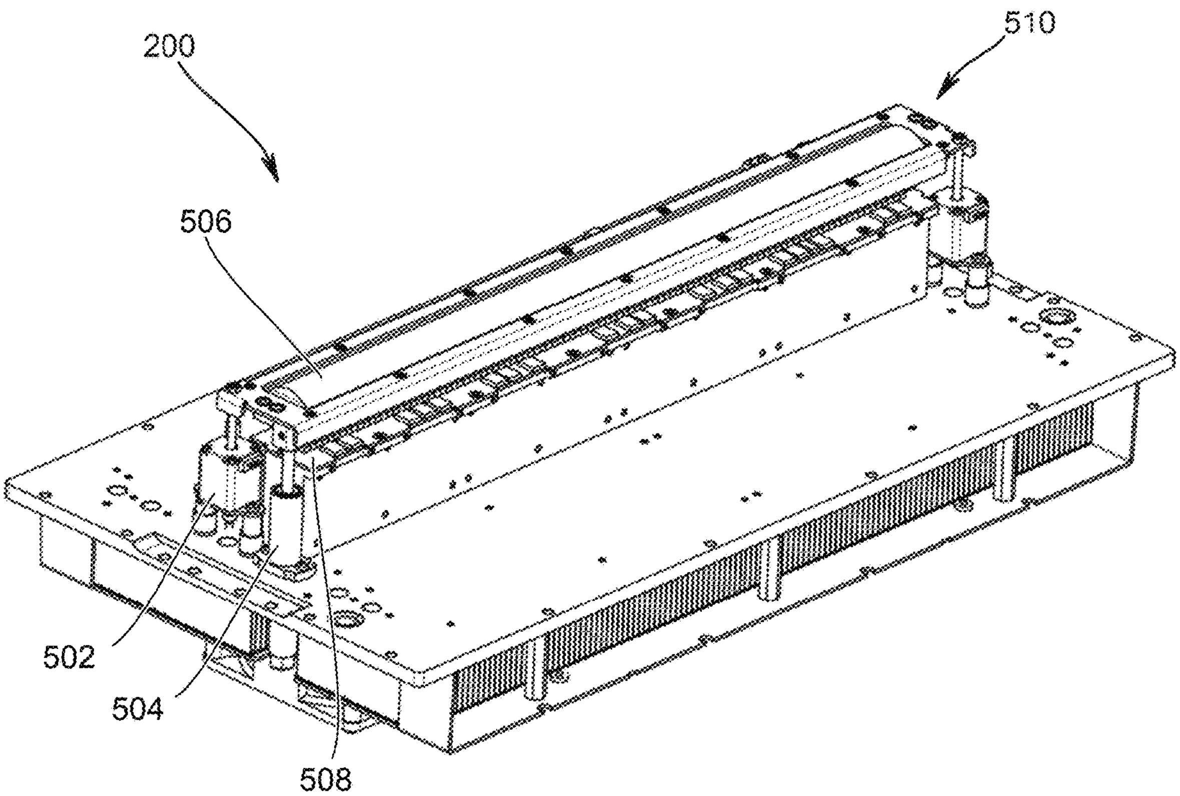
FIG. 5 presents a view of a third array light engine of the luminaire of FIG. 1.

FIG. 5 presents a view of a portion of the optical assemblies 200 within head 102 of the luminaire 100 showing a third array light engine 510. As will be seen in more detail in FIG. 6, the array light engine 510 comprises a linear lens 506. The linear lens 506 has a long axis and a short axis. Across its short axis, the linear lens 506 has a concave-convex cross-section. In other embodiments, the linear lens 506 may have another cross-section, such as plano-convex, concave-convex, convex-convex, or their inverse combinations, so as to produce a desired light output. A plurality of light emitters is mounted in a linear array on a circuit board 508 so as to emit a first linear light beam into the linear lens 506, which emits a second linear light beam. In embodiments where the light emitters emit beams having different colors, a light mixing element may be incorporated to ensure uniform color blending. Such light mixing elements may include fly-eye lenses, light diffusers, mixing rods, mixing chambers, or combinations of optical elements.

The linear lens 506 is configured to move along the optical axis of the array light engine 510. When the linear lens 506 is close to the light emitters, the optical system is configured to emit a wide-angle linear output beam. As the linear lens 506 is moved away from the light emitters, the emitted linear beam narrows in angle towards a configuration where the emitted linear beam is at its narrowest angle. In such a configuration, the linear lens 506 is at its greatest separation from the linear array of light emitters. By controlling a separation of the linear lens 506 from the light emitters, the user may select a desired output angle for the emitted linear beam.

In the embodiment illustrated, linear lens 506 is mounted on shafts within linear bearings 504 and is moved along the optical axis by motors 502, which drive linear motion lead screws. In other embodiments, other mechanisms may be used to move the linear lens 506, including gears, belts, or other mechanical systems.

Figure 6:
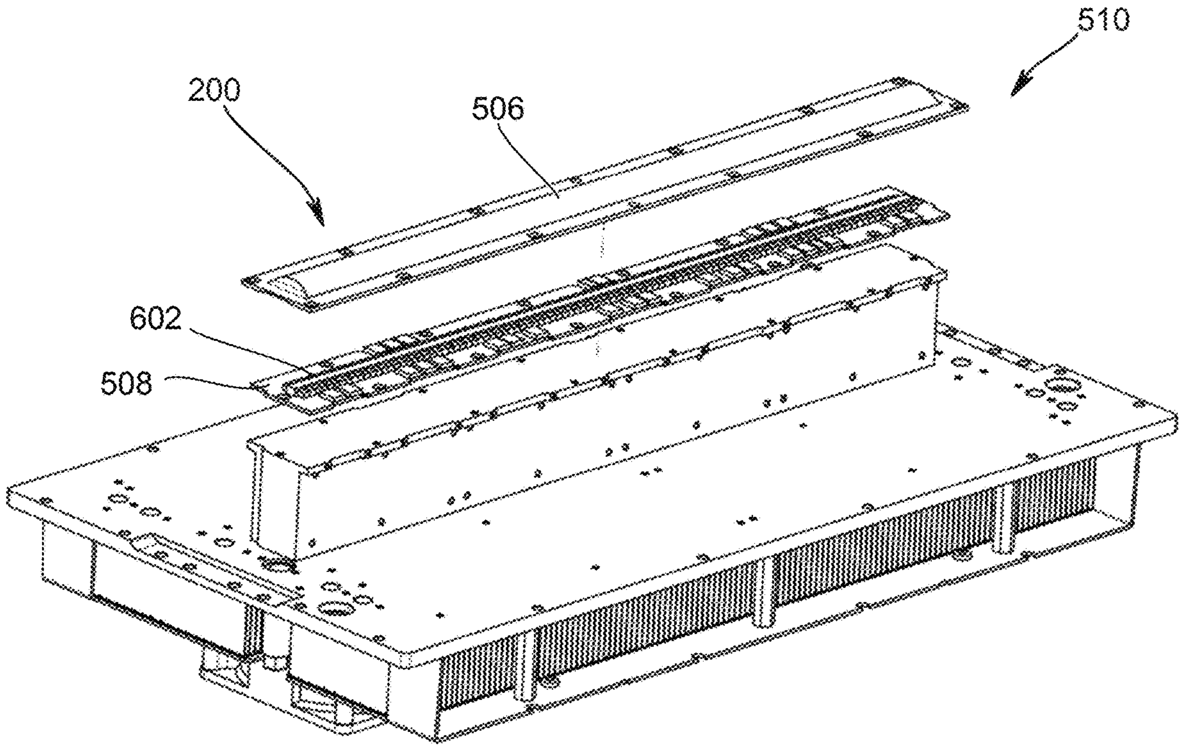
FIG. 6 presents a partially exploded view of the third array light engine of FIG. 5.

FIG. 6 presents a partially exploded view of the array light engine 510 of FIG. 5. A plurality of light emitters 602 is mounted on the circuit board 508 in a linear array and configured to emit a diverging linear light beam into linear lens 506. A long axis of the linear array of light emitters 602 is parallel to the long axis of the linear lens 506. The light emitters 602 comprise one or more of a single LED, an LED array, a single laser, a laser array, or other type of light source capable of emitting colored light, white light, or a combination of both. In some embodiments, the light emitters 602 are a plurality of single LEDs configured in a linear array.

Figure 7A:
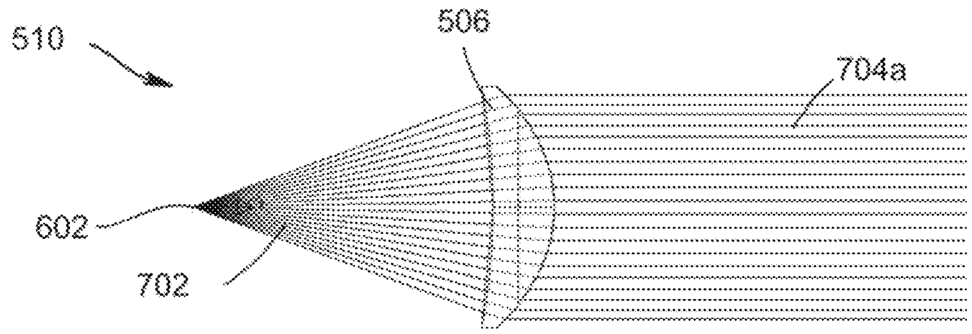
FIGS. 7A, 7B, and 7C present ray trace diagrams of the array light engine of FIG. 5 in configurations producing different beam angles.
Figure 7B:
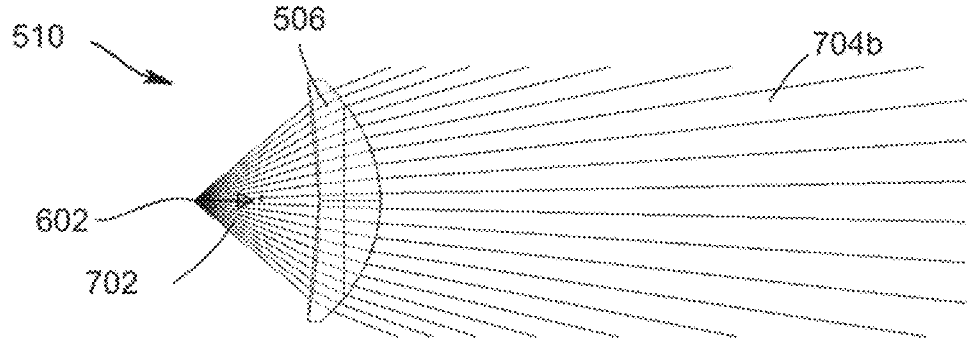
Figure 7C:
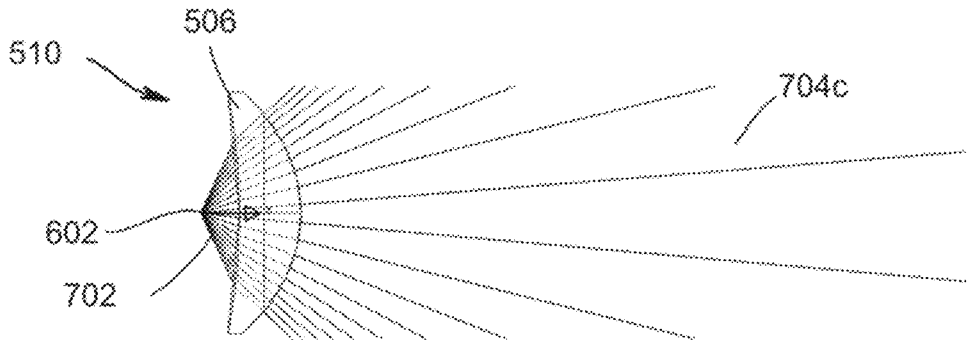

FIGS. 7A, 7B, and 7C present ray trace diagrams of the array light engine 510 of FIG. 5 in configurations producing different beam angles in an emitted linear light beam. Note that, for clarity, FIGS. 7A, 7B, and 7C show a cross-section of the linear lens 506 and the diverging linear light beam 702 emitted by the linear array of light emitters 602. In FIG. 7A, the diverging linear light beam 702 from the light emitters 602 enters the linear lens 506, which is positioned at its farthest separation from the light emitters 602. In the configuration shown in FIG. 7A, the emitted linear light beam 704*a* is at its narrowest angle and is substantially collimated. In FIG. 7B, the linear lens 506 is positioned at a separation from the light emitters 602 that is intermediate between the configurations of FIGS. 7A and 7C and the emitted linear light beam 704*b* is a diverging beam having an intermediate angle that is wider than the beam of FIG. 7A but narrower than the beam of FIG. 7C. In FIG. 7C, the linear lens 506 is positioned at its closest separation from the light emitters 602 and the emitted linear light beam 704*c* diverges at its widest angle.

As described above, electromechanical mechanisms of the luminaire 100—such as the motors 202 and the motors 502—may be under the control of a microcontroller or other programmable control system included in the luminaire 100. The control system may be controlled via a user interface included in the luminaire 100. In some embodiments, the control system may additionally or alternatively be in wired or wireless communication via a data link with a remotely located control console that an operator uses to indicate desired configurations of one or more of the array light engines 216, 218, and/or 510. In such embodiments, the operator is able to send commands to the control system specifying one or more configurations of the array light engines 216, 218, and/or 510 as well as brightness and color of light emitters 302 and/or 602. In response, the control system is configured to provide individual and independent control to position the array light engines 216, 218, and/or 510 in the configuration(s) specified in the commands and/or to cause the light emitters 302 and/or 602 to emit light of the brightness and/or color specified in the commands.

Figure 8:
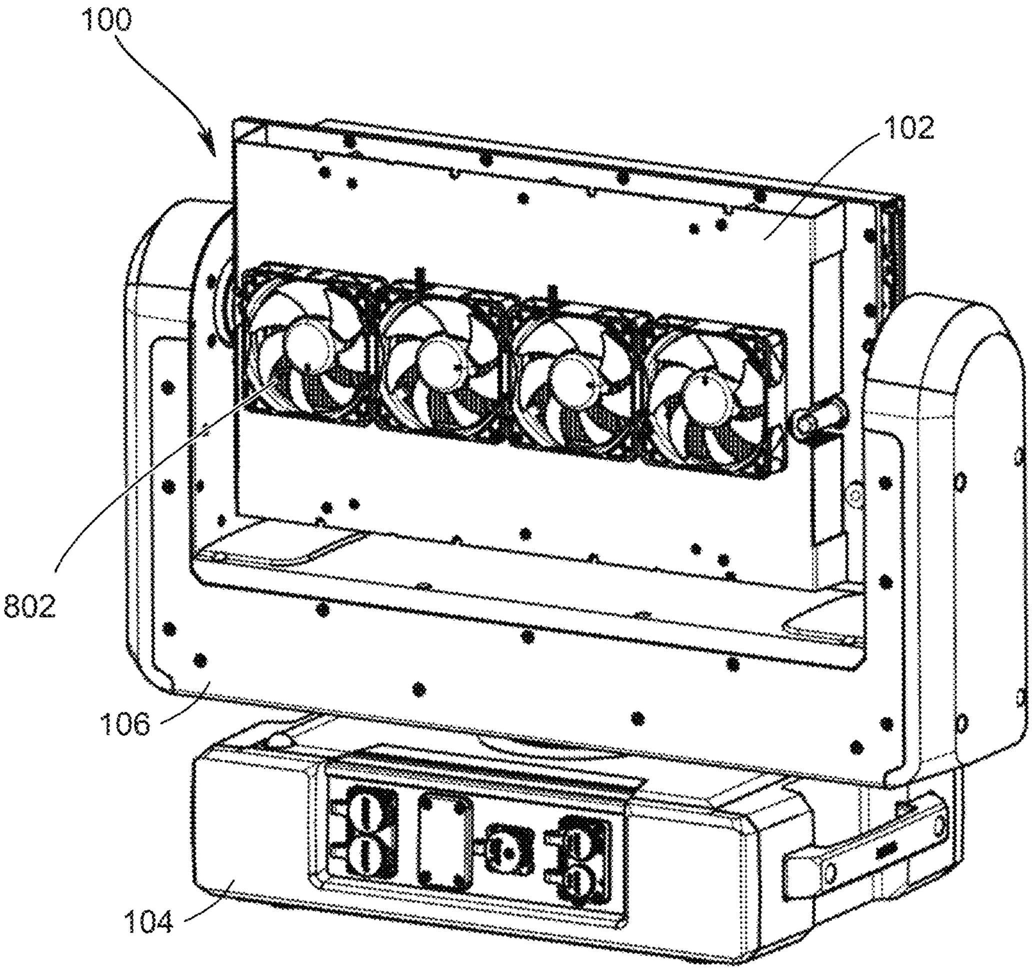
FIG. 8 presents a rear view of the luminaire of FIG. 1, with head covers removed.

FIG. 8 illustrates a rear view of the luminaire 100 of FIG. 1, with head covers removed. The head 102 of the luminaire 100 comprises the cooling fans 802.

While the luminaire 100 includes one array light engine 510 with the associated linear lens 506 and two array light engines 216 and 218, with the associated lens arrays 210 and 212, in other embodiments, a luminaire according to the disclosure may include only the array light engine 510 with the associated linear lens 506. In still other embodiments, a luminaire according to the disclosure may include only a single array light engine 216 or 218, with an associated lens array 210 or 212, with or without the array light engine 510 with the associated linear lens 506. Still other embodiments may include combinations of any number and/or arrangement of array light engines with a linear output lens, according to the disclosure, and array light engines with two lens arrays.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire comprising:

a first array light engine, comprising a plurality of light emitters configured to emit a first plurality of collimated light beams, and first and second lens arrays, each lens array comprising a plurality of lenslets, wherein:

the first lens array is in a fixed position relative to the plurality of light emitters;

the second lens array is configured to move along an optical axis of the first array light engine relative to the first lens array;

the first lens array is configured to receive the first plurality of collimated light beams and emit a second plurality of light beams;

the second lens array is configured to receive the second plurality of light beams and to emit a third plurality of light beams; and light rays of the third plurality of light beams are collimated when the second lens array is at its greatest separation from the first lens array and become increasingly divergent as the second lens array moves closer the first lens array; and a second array light engine, comprising a linear array of light emitters configured to emit a diverging first linear light beam, and a linear lens configured to receive the diverging first linear light beam and to emit a second linear light beam, wherein:

a long axis of the linear array of light emitters is parallel to a long axis of the linear lens;

the linear lens is configured to move along the optical axis of the second array light engine relative to the linear array of light emitters;

the light rays of the second linear light beam are collimated when the linear lens is at its greatest separation from the linear array of light emitters and become increasingly divergent as the linear lens moves closer to the linear array of light emitters; and a control system configured (i) to control a beam angle of the third plurality of light beams by moving the second lens array relative to the first lens array along an optical axis of the first array light engine and (ii) to control a beam angle of the second linear light beam by moving the linear lens relative to the linear array of light emitters along an optical axis of the second array light engine.

2. The luminaire of claim 1, wherein the plurality of lenslets of the first lens array and the plurality of lenslets of the second lens array are identical.

3. The luminaire of claim 1, wherein the lenslets of the first lens array and the second lens array comprise only convex-convex lenslets.

4. The luminaire of claim 1, wherein the linear lens has a concave-convex cross-section.

5. The luminaire of claim 1, further comprising a stepper motor configured to move the second lens array.

6. The luminaire of claim 1, further comprising a stepper motor configured to move the linear lens.

7. The luminaire of claim 1, wherein the light emitters of the plurality of light emitters of the first array light engine comprise total internal reflection (TIR) lenses configured to collimate and mix colors of the light rays from the light emitters.

8. The luminaire of claim 1, wherein the light emitters of the plurality of light emitters of the first array light engine comprise a light emitting diode (LED) array including red, green, blue, and white LEDs.

9. The luminaire of claim 1, wherein the light emitters of the linear array of light emitters comprise white LEDs.

10. The luminaire of claim 1, further comprising:

a head that includes the first array light engine and the second array light engine, the head configured to rotate within a yoke about a tilt axis, wherein the yoke is configured to rotate relative to a fixed enclosure about a pan axis.

11. The luminaire of claim 1, wherein the control system is configured to provide individual and independent control of a position of the second lens array relative to the first lens array and a position of the linear lens relative to the linear array of light emitters.

12. The luminaire of claim 11, wherein the control system is configured to provide individual and independent control of brightness and color of the light emitters of the first array light engine and/or of the linear array of light emitters.

13. The luminaire of claim 12, wherein the control system is configured to receive a first command via a data link and, in response to the first command, move one or both of the second lens array and the linear lens to positions specified in the first command.

14. The luminaire of claim 13, wherein the control system is configured to receive a second command via the data link and, in response to the second command, cause the light emitters of the first array light engine and/or the linear array of light emitters to emit light of a brightness and/or color specified in the second command.

* * * * *